April 17, 1962  E. B. WESTLAKE, JR  3,030,246
MANDREL
Filed Jan. 19, 1959
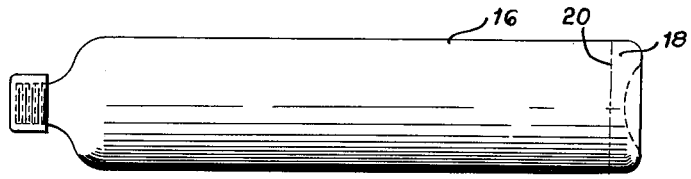
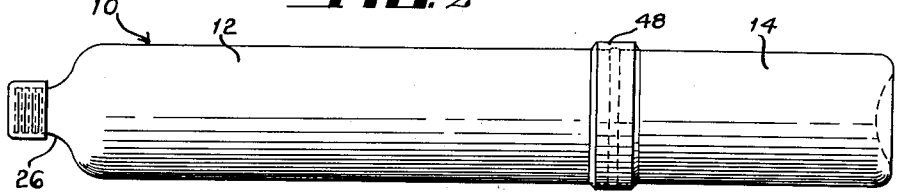
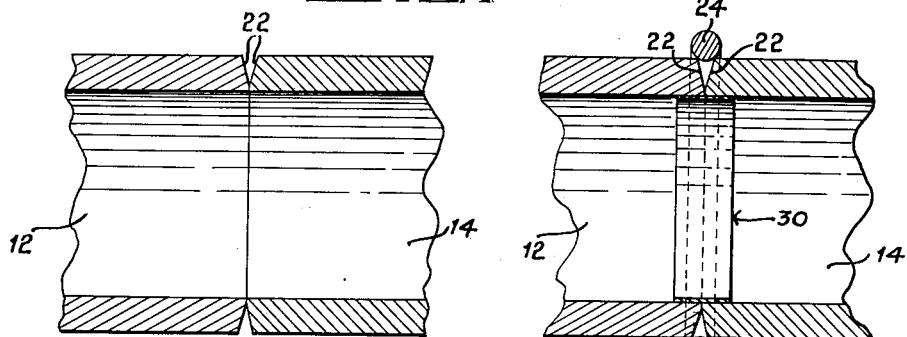
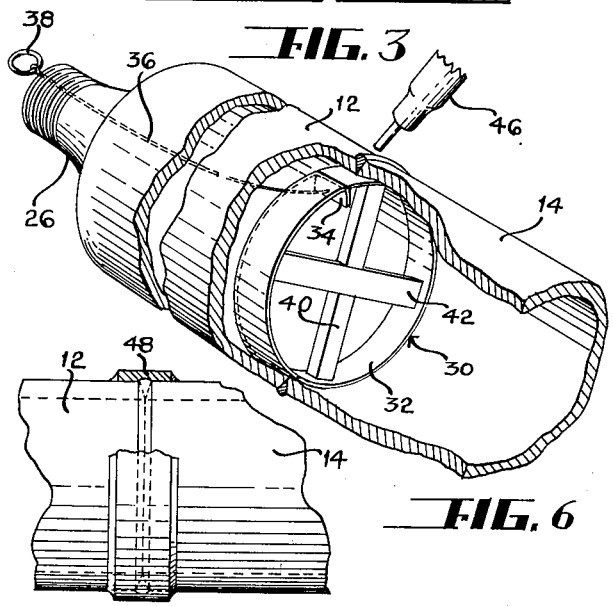
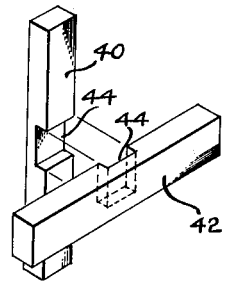
INVENTOR.
EDWARD B. WESTLAKE JR.
BY
HIS ATTORNEYS United States Patent Office 3,030,246
Patented Apr. 17, 1962

3,030,246
MANDREL
Edward B. Westlake, Jr., 307 Lincoln Ave.,
Havertown, Pa.
Filed Jan. 19, 1959, Ser. No. 787,735
3 Claims. (Cl. 269—52)

This invention relates to a method of and apparatus for welding plastics, and more particularly relates to such method and apparatus used in welding together two abutting cylinders of plastic material, although not necessarily so limited.

The method and apparatus which form the subject matter of the present invention may be used in joining together any cylindrical members, but are particularly useful in joining together two plastic bottles to form a single larger bottle. Bottles of the type shown here are utilized for storing and transporting radioactive material, as well as for other purposes.

By the process now used in manufacturing polyethylene bottles, it is not feasible to manufacture a bottle more than four feet in length. For some purposes it is desirable to have a longer bottle, as for example, six feet in length, in that such longer bottles make better use of the available storage space. That being the case, in order to obtain bottles six feet long, it is necessary to sever two bottles and join the top of one to the bottom of the other, so as to produce a bottle of the desired length. If, for example, the bottom is cut off of one bottle and another bottle is cut transversely through the center, the bottom of the second bottle and the top of the first bottle may be welded together, so as to produce a bottle six feet long. The remnants of the two bottles that have been severed may be welded together, so as to produce a bottle two feet long. By this method, from two bottles four feet long, one six foot bottle and one two foot bottle are produced. The above dimensions have been merely used for purposes of illustration.

In assembling the two cylindrical elements to form a bottle of the desired length, two elements of the proper dimensions are first chosen, one having a reduced neck portion and the other having a closed end. A novel collapsible mandrel is fitted within one of the elements in such manner that it protrudes slightly from the open end. The other element is then fitted over the mandrel and abutted against the first element. Sealing material is applied to the joint, which is heated to weld together the two elements and then tested for leaks. A protective band is then secured around the joint.

It is, accordingly, an object of the present invention to provide a novel method for welding together two plastic elements.

Another object is to provide a novel tool used in the welding together of two tubular elements.

Other objects and advantages reside in the construction of parts, the combination thereof, the method of manufacture and the mode of operation, as will become more apparent from the following description.

In the drawings,

FIGURE 1 is an elevational view of a completed plastic bottle produced utilizing the method and apparatus of the present invention.

FIGURE 2 is an elevational view of a typical small bottle, a plurality of which may be used to form the larger bottle shown in FIGURE 1.

FIGURE 3 is a fragmentary sectional view showing two cylindrical hollow elements butted together in preparation for a welding operation.

FIGURE 4 is a fragmentary sectional view showing the two cylindrical elements of FIGURE 3, now supported on a mandrel from the inside and with a rod of plastic welding material positioned for use.

FIGURE 5 is a fragmentary detail view of the two cylindrical elements welded together with a protective sleeve in place over the weld joint.

FIGURE 6 is a perspective view, partly broken away, showing two sections of a bottle welded together with the novel mandrel still in place within the bottle before its removal.

FIGURE 7 is a perspective view showing two cross braces which form a part of the mandrel.

Referring now to FIG. 1, there is shown a container 10 of plastic material, such as polyethylene, formed according to the teaching of the present invention from two cylindrical tubular elements 12 and 14. The elements 12 and 14 are each made from a polyethylene container, such as the container 16 shown in FIGURE 2. The element 12 is obtained by cutting off the closed end 18 of the container 16 along the line 20, while the element 14 is obtained by cutting off the reduced neck portion of the container 16.

As shown in FIGURES 3 and 4, the cut ends of the two elements 12 and 14 which are to be joined together are beveled as at 22. This results in a V-shaped notch where the elements 12 and 14 are butted together for receiving plastic material, such as polyethylene, used to weld the two elements 12 and 14 together to form the single unitary structure of the container 10 shown in FIGURE 1. This plastic material is provided in the form of a flexible rod 24 which is positioned adjacent the notch and then heated, together with the adjacent portions of the elements 12 and 14, to melt and fill the notch, thereby welding or fusing together said elements.

In order to maintain the two elements 12 and 14 in proper alignment during the welding operation, some type of jig or mandrel positioned within the two elements to hold them in proper relationship with respect to each other is desirable. Such a mandrel also serves to prevent running of the plastic material of the elements 12 and 14 into the interior of the container during the heating operation. In addition, the mandrel may be used for a leak testing operation, as will be subsequently described. It will be readily apparent that the primary problem here is in providing such a mandrel which may be removed once the welding operation has been completed, since after the two elements 12 and 14 have been secured together, the only means of access to and egress from the interior is through the narrow neck 26 of the container 10. The novel mandrel 30 of the present invention overcomes this difficulty, as will now be described.

The mandrel 30 includes an outer ring-like member 32 made of resilient material, such as spring steel. One end of the member 32 is bent over to form a tab or flange 34, and to this tab is secured a wire 36 having at its other end a pulling ring 38. Two braces 40 and 42 of wood, or other suitable material, complete the mandrel. These braces are designed to be positioned at right angles to each other. These braces 40 and 42 are notched at 44. This permits the two braces to interlock when mounted in the band or ring-like member 32. The thickness of the wall of the bottle varies from one end to the other. The bottom end may be somewhat thicker than the center portion and the top. The mandrel 30 is inserted into the piece having the thickest wall, as will appear more fully from the description that follows.

In use, the mandrel 30 is assembled within the element 12 so that the ring-like member 32 assumes a circular shape inside the element 12 and adjacent its open end, so that a portion of the member 32 extends beyond the open end of the element 12, with the bent-over tab 34 contacting, or in close proximity to, the other end of said member. The two cross braces 40 and 42 are assembled and positioned within the ring-like member 32 to hold it in its extended circular position. The wire 36 is outside the narrow neck 26. The open end of element 14 is then moved into abutting relationship with the open end of the element 12 by placing the open end of the element 14 on the ring-like member 32 and then shifting the element 14 toward the element 12 until the two abut. It can readily be seen that if the outer diameter of the two pieces are equal and the wall of member 12 thicker than the wall of member 14, member 14 may be inserted upon the mandrel 30 without disturbing or moving the mandrel.

The rod 24 of welding material is then positioned over the notch formed by the two beveled surfaces 22 and is heated, together with the adjacent portion of the elements 12 and 14, by any appropriate means, so that it becomes plastic or fluid and flows into said notch to weld or fuse the elements 12 and 14 together.

The weld joint may next be tested for leaks by passing an electrode 46 connected to a high frequency potential source around the weld joint. In the event of a leak, a spark will pass through the opening causing the leak and jump the gap between the electrode 46 and the ring-like member 32 of the mandrel 30.

After any leaks in the weld joint have been sealed, a protective band 48 of suitable material, such as polyethylene, may then be applied over the weld joint to increase the strength of said joint, and secured by welding along its edges.

When the fabrication of the container 10 has been completed, the mandrel 30 may be removed from the container 10 by grasping the ring 38 and pulling with sufficient force to move the tab 34 out of engagement with the other end of the member 32. This causes the cross braces 40 and 42 to be jarred from the position in which they are shown in FIGURE 6, so that the member 32 is permitted to relax from its extended circular position. The wire 36 may then be employed to draw the member 32 out of the container 10 through the neck 26. Also, the braces 40 and 42, which separate from each other when jarred out of operative position, will fall out of the container 10 if said container is held in a position with the neck 26 downward.

The container 10 is then ready for use and the mandrel 30 may be re-used for welding of additional containers.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A mandrel for use in the welding together of tubular plastic elements comprising, in combination, a resilient member constrained in circular configuration within the inner circumference of the plastic elements; an end tab on one end of said member located in abutting relation to the other end of said member; a wire secured to the end tab; said wire projecting out beyond one of said elements; a pair of braces positioned diametrically within the circle formed by said resilient member; and cooperating notches intermediate the ends of each of the braces retaining them in interlocked relationship.

2. A mandrel for use in the welding together of tubular plastic elements having one end closed and the other end provided with an opening smaller than the diameter of the tubular elements comprising, in combination, a circular band adapted to be positioned within the inner circumference of the plastic elements; an end tab on one end of said band; a wire secured to the end tab said wire extending through the opening; means on the end of said wire and located on the outside of said tubular elements to facilitate grasping it; a pair of braces arranged to fit diametrically within the circle formed by said resilient member; and formations on the braces for loosely interconnecting them.

3. A mandrel for use in the welding together of tubular plastic elements having one end closed and the other end provided with an opening smaller than the diameter of the tubular elements comprising, in combination, a resilient member of circular configuration adapted to be positioned within the inner circumference of the plastic elements; a wire secured to one end of the resilient member, said wire projecting outwardly through said opening; means on one end of said wire and located outside of said tubular elements to facilitate grasping it; a pair of braces arranged to fit diametrically within the circle formed by said resilient member; and means on the braces for loosely interconnecting them.

References Cited in the file of this patent

UNITED STATES PATENTS

| | | |
|---|---|---|
| 861,106 | Georgenson | July 23, 1907 |
| 1,607,384 | Ball | Nov. 16, 1926 |
| 2,456,513 | Johnson | Dec. 14, 1948 |
| 2,751,321 | Sans | June 19, 1956 |
| 2,839,441 | Kent | June 17, 1958 |